H. W. MATHER.

STAIR PAD.

No. 10,550. Reissued Jan. 13, 1885.

WITNESSES:

E. B. Bolton

C. H. Fraser.

INVENTOR:

Henry W. Mather

By his Attorneys,

Burke, Fraser & Connett

UNITED STATES PATENT OFFICE.

HENRY W. MATHER, OF BUTLER, NEW JERSEY

STAIR-PAD.

SPECIFICATION forming part of Reissued Letters Patent No. 10,550, dated January 13, 1885.

Original No. 289,920, dated December 11, 1883. Application for reissue filed December 19, 1884.

*To all whom it may concern:*

Be it known that I, HENRY W. MATHER, a citizen of the United States, and now a resident of Butler, in the county of Morris and State of New Jersey, have invented certain Improvements in Stair-Pads, of which the following is a specification.

My invention relates to a pad to be placed on the the step of a stair under the stair-carpet. Such pads have been made from the usual material employed as carpet-linings—as, for example, two sheets of paper or cloth with a layer of raw cotton or cotton-batting between them. Such I do not claim.

My pad possesses the following characteristics, namely: It is made of felt—preferably of cotton felt of a soft, moderately yielding, and elastic character. It is sufficiently stiff or rigid to retain its shape and to be handled conveniently, and it has formed in its front edge a curved hook-like portion or lip which takes over the edge of the stair tread or step, so as to be interposed, when the pad is in place, between the said edge and the carpet.

I usually make the pads thicker at some parts than at others; but I do not limit myself to this. It may be of uniform thickness throughout.

Figure 1:
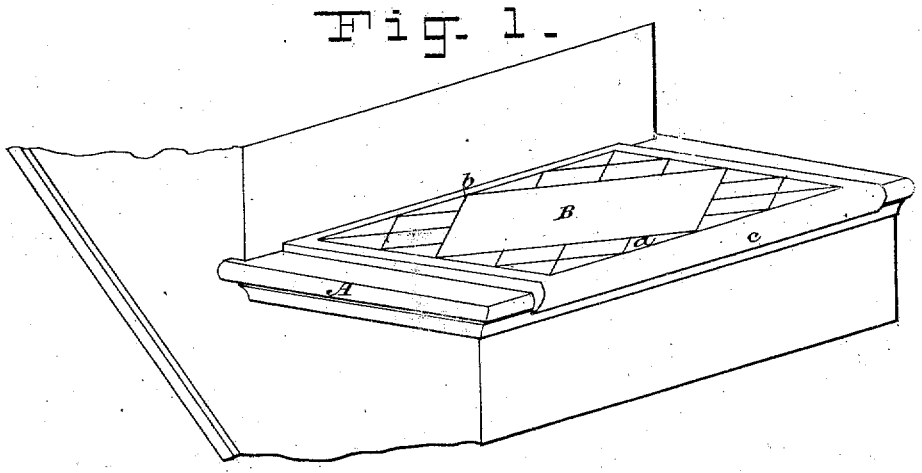
Figure 2:
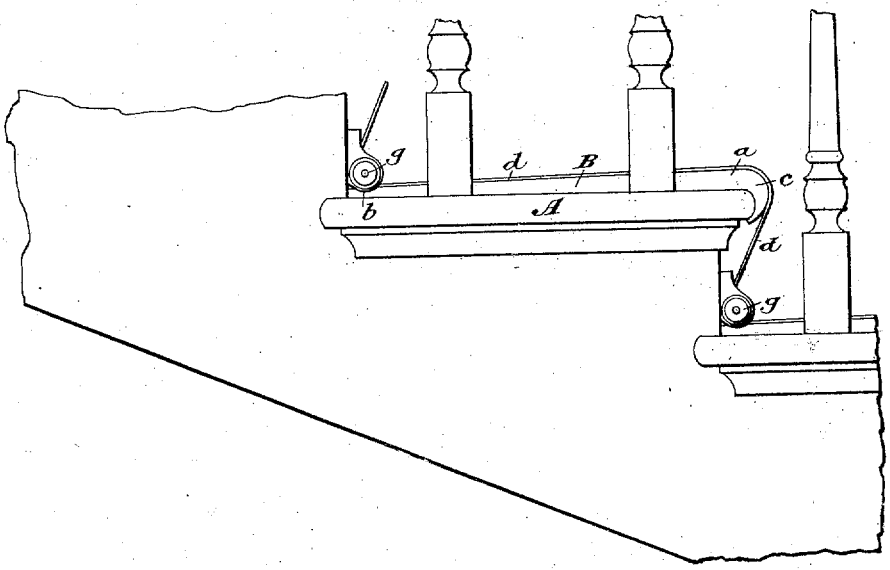
Figure 3:
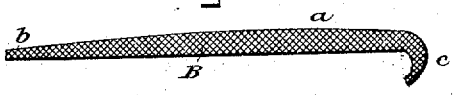

In the drawings which serve to illustrate my invention, Figure 1 is a perspective view, showing the step of the stair with one of my improved pads placed thereon. Fig. 2 is a side elevation of the stair, showing my pad in place on the step and the carpet in place over the pad. Fig. 3 is a cross-section illustrating a modified form of my improved pad.

A represents a step or tread of a stair, and B represents my improved pad. This pad comprises a body portion, which is by preference made thickest at its front edge, *a*, and thinnest at its rear edge, *b*, and a hook-like portion or lip, *c*, which takes over the front edge of the tread A, as shown.

The material of the pad is, as before stated, elastic felt, and the curved lip *c* is formed on it in the process of making the pad. The variation in thickness, if any, is also given in the process of making the pad.

Although I do not limit myself to any particular manner of making my improved pad, I will say that it may be made by molding or forming in any well-known way a flat pad of the felt, and then while moist or wet bending the front edge over a form to produce the lip *c*, in which position the pad is left until dry, when the lip will retain its proper form.

The parts are completed ready for use and sale as independent articles of manufacture, and will retain substantially the form and character shown until worn out.

The thickening of the pad at *a* provides an elastic cushion for the foot, and serves to fully protect the carpet, while the thinning of the rear edge, *b*, avoids a ridge in the carpet near the riser, and permits of the insertion of the pad under the stair-rod *g*.

The pad shown in Fig. 3 differs from that shown in the principal figures only in the thicker part *a* being nearer the middle of the pad.

I may make the pads of equal thickness throughout, as before stated, or convex on top. The under side, where the pad rests on the step, should be plain or level.

The ornamentation on the upper surface of the pad in Fig. 1 is not essential. It is employed, when employed at all, simply to enhance the appearance of the pad.

As my pad is only intended to be employed in connection with a stair-carpet, it is not necessary to provide it with any means for securing it to the step other than that afforded by the carpet itself. A single tack driven in near the rear edge might, however, be employed. This attachment would prove a convenience in laying the carpet.

I have said that the material employed in my improved pad is felt. By this word I mean to signify a fabric made from any or all of the well-known fibrous materials, and known as "felt" by all who are skilled in the manufacture of paper and felted fabrics of all kinds. Such felt is made from what are technically called "satinets" and "colors," and from cotton waste, hair waste, straw, hay, woolen waste, old papers, and similar cheap fibrous materials, as well as from the more expensive kinds of fiber which will form a porous, spongy, heavy paper felt. Such felted fabrics are suited to saturation for roofing and for various other uses. I have before said that I prefer to use cotton felt for my pad, and I employ by preference a pulp made from "colors" or "seconds," so called, beaten in an ordinary beating-engine. I use for my purpose, however, any and all of the above-named materials, and in any proportion, as economy or advantage may dictate or suggest, preferring the cheaper kinds, and such as will combine best and most advantageously. These, before felting, are reduced to a pulp in a beating-engine, such as is commonly used by makers of paper, roofing-felts, &c. My invention, then, contemplates the use of any of the materials named, or of any fibrous material that will form a loose spongy pulp in the construction of my pad—that is to say, the use of any such fibrous materials, either animal or vegetable, as will when reduced to a pulp be suited to the manufacture of what is known to felt and paper makers as "felt."

Having thus described my invention, I claim—

1. As an improved article of manufacture, a stair-pad made from felt of the character described, and sufficiently rigid or stiff to retain its form, and having a lip formed on its front edge, substantially as and for the purposes set forth.

2. As an improved article of manufacture, a stair-pad of felt of the character described, made thicker at its front edge than at its rear edge, and having a lip formed on its front edge, substantially as and for the purposes set forth.

In witness whereof I have hereunto signed my name in the presence of two subscribing witnesses.

HENRY W. MATHER.

Witnesses:
HENRY CONNETT,
ARTHUR C. FRASER.